United States Patent [19]

Makowski et al.

[11] 4,285,851

[45] Aug. 25, 1981

[54] PROCESS FOR CONTROLLED GELATION OF POLYMERIC SOLUTION (C-974)

[75] Inventors: Henry S. Makowski, Scotch Plains; Robert D. Lundberg, Bridgewater, both of N.J.

[73] Assignee: Exxon Research & Engineering Co., Florham Park, N.J.

[21] Appl. No.: 136,834

[22] Filed: Apr. 3, 1980

[51] Int. Cl.$^3$ ............................................. C08L 23/32
[52] U.S. Cl. .................... 260/29.6 SQ; 260/DIG. 31; 525/344
[58] Field of Search .................... 260/29.6 E, 29.6 N, 260/29.6 PM, 29.6 SQ, DIG. 31; 525/344

[56] References Cited

U.S. PATENT DOCUMENTS

| | | | |
|---|---|---|---|
| 2,809,959 | 10/1957 | Roth | 260/29.6 SQ |
| 2,813,087 | 11/1957 | Roth | 525/344 |
| 3,554,287 | 1/1971 | Eilers | 260/29.2 EP |
| 3,870,841 | 3/1975 | Makowski | 260/DIG. 31 |
| 4,157,432 | 6/1979 | Lundberg | 525/344 |
| 4,226,751 | 10/1980 | Lundberg | 260/DIG. 31 |

*Primary Examiner*—Paul R. Michl
*Attorney, Agent, or Firm*—Richard E. Nanfeldt

[57] ABSTRACT

The present invention relates to a process for forming a polymeric solution or gel having a viscosity of at least about 50,000 cps which includes the steps of dissolving an amine terminated polyalkylene oxide neutralized sulfonated polymer in a solvent to form a polymeric solution, a concentration of the amine terminated polyalkylene oxide neutralized sulfonated polymer in the solution being about 0.1 to about 20 wt. %, a viscosity of the solution being less than about 20,000 cps; and adding about 1 to about 500 vol. % water to the polymeric solution having a viscosity less than about 20,000 cps, the water being immiscible with the solvent and the polymeric solution, the viscosity of said polymeric solution increasing rapidly upon the addition of said water from less than 20,000 cps to greater than 50,000 cps.

31 Claims, No Drawings

PROCESS FOR CONTROLLED GELATION OF POLYMERIC SOLUTION (C-974)

BACKGROUND OF THE INVENTION

1. Field of the Invention

The present invention relates to a process for forming a polymeric solution or gel having a viscosity of at least about 50,000 cps which includes the steps of dissolving an amine terminated polyalkylene oxide neutralized sulfonated polymer in a solvent to form a polymeric solution, a concentration of the amine terminated polyalkylene oxide neutralized sulfonated polymer in the solution being about 0.1 to about 20 wt. %, a viscosity of the solution being less than about 20,000 cps; and adding about 1 to about 500 vol. % water to the polymeric solution having a viscosity less than about 20,000 cps, the water being immiscible with the solvent and the polymeric solution, the viscosity of said polymeric solution increasing rapidly upon the addition of said water from less than 20,000 cps to greater than 50,000 cps.

2. Description of the Prior Art

There are many applications for very viscous or gelled solutions of polymers in organic liquids which are quite diverse. There are also a number of physical and chemical techniques for preparing such systems. The present invention is concerned with a process for converting a relatively low viscosity organic liquid solution of an ionic polymer into a very viscous or gelled system via a rapid process which under certain conditions can be reversed. The potential applications for this process and the products derived therefrom will be evident in the instant application.

There are major problems in the direct preparation of viscous polymer solutions or gels via conventional techniques such as polymer dissolution. For example, attempts to form a high viscosity (>500,000 cps) solution of polystyrene in a suitable solvent such as xylene can be difficult. The levels of polymer required are either very high (20 to 50 wt. % concentration) or the molecular weight of the polymer must be extremely high. In either event the dissolution process is extremely slow even at elevated temperatures, and even then it is difficult to achieve homogeneous polymer solutions free of local concentrations of undissolved, or poorly dissolved polymer. Thus, the process of achieving such solutions can be difficult and the concentration of polymer in the solution to achieve high viscosities can be uneconomically high.

There are various chemical approaches to the solution of the problems outlined above, that is polymer chain lengthening reactions which can occur to give viscous solutions such as by the reaction of hydroxyl terminated polymers with diisocyanates etc. Such processes have inherent disadvantages which preclude their use in the intended applications of this invention.

The instant invention describes a process which permits (1) the preparation of polymer solutions of sulfonated polymers in organic liquid having reasonably low viscosities (i.e., less than about 20,000 cps), (2) the preparation of extremely viscous solutions or gels from such solutions by the simple process of mixing water with the polymer solution and (3) the reversion of such viscous solutions or gels to relatively low viscosity mixtures by the reincorporation of polar cosolvents which are water immiscible at a desired stage. These operations are achieved by the use of the appropriate concentration of polymers having low concentrations of ionic groups present, preferably metal sulfonate groups. Such polymers are described in detail in a number of U.S. Pat. Nos. (3,836,511; 3,870,841; 3,847,854; 3,642,728; 3,921,021) which are herein incorporated by reference. These polymers possess unusual solution characteristics some of which are described in U.S. Pat. No. 3,931,021. Specifically such polymers such as lightly sulfonated polystyrene containing about 2 mole % sodium sulfonate pendant to the aromatic groups are typically not soluble in solvents commonly employed for polystyrene itself. However, the instant invention describes a select class of amine terminated polyalkene oxide neutralized sulfonated polymers which readily dissolve in selected solvents.

The remarkable and surprising discovery of the instant invention pertains to the following observation.

When small (or large) amounts of water are combined and mixed with solutions of the critical selected ionic polymers dissolved in the solvent as those described above, it is possible to convert such low viscosity systems into extremely viscous gels or solutions. Indeed, it is possible to achieve increases in viscosity by factors of $10^4$ (10,000) or more by the addition of only 5 to 15% water based on the polymeric solution volume.

SUMMARY OF THE INVENTION

The present invention relates to a process for forming a viscous polymeric solution or gel having a viscosity of at least about 50,000 cps which includes the steps of dissolving an amine terminated polyalkylene oxide neutralized sulfonated polymer in a solvent to form a polymeric solution, a concentration of the amine neutralized sulfonated polymer in the polymeric solution being about 0.1 to about 20 wt. %, a viscosity of the polymeric solution being less than about 20,000 cps; and adding about 1 to about 500 vol. % water to the polymeric solution having a viscosity less than about 20,000 cps, the water being immiscible with the solvent and the polymeric solution, the viscosity of said polymeric solution increasing rapidly upon the addition of water from less than 20,000 cps to greater than 50,000 cps.

Accordingly, it is a primary object of the instant invention to describe a process for forming a highly viscous or gelled polymeric solution having a viscosity greater than about 50,000 cps, preferably greater than 500,000 cps.

A further object of the instant invention is to provide a process for forming a gel solution which can be used as an encapsulating material, a coating material, as a means of forming a plug within a bore of an elongated member, or as a means of filling an opening in an article. In addition, this technique can be employed as an approach to join lubricating gels or greases which display a significant resistance to flow.

A still further object of the present invention is to employ the instant process as an integral part of well control procedures which are initiated when unwanted pore fluid influxes have entered the wellbore from subterranean formations. A thin fluid solution, separated from the water base drilling mud by suitable fluid spacers, could be circulated down the drill pipe string and out through the jet nozzles in the drill bit. Upon contacting water in the drill pipe-formation annulus, a viscous gel would be formed that could prevent further pore fluid movement and avoid the risk of a catastrophic well blowout. This type of procedure would have several advantages over current, conventional well control methods which rely on the hydrostatic gradient of a heavy fluid placed in the annulus to control the well in the event of pore fluid influxes.

GENERAL DESCRIPTION

The present invention relates to a process for forming a polymeric solution having a viscosity of at least about 50,000 cps which includes the steps of dissolving an amine terminated polyalkylene oxide neutralized sulfonated polymer in a solvent to form a polymeric solution, a concentration of the amine terminated polyalkylene oxide neutralized sulfonated polymer in the polymeric solution being about 0.1 to about 20 wt. %, a viscosity of the polymeric solution being less than about 20,000 cps; and adding about 1 to about 500 vol. % water to the solution having a viscosity less than about 20,000 cps, the water being immiscible with the solvent and the polymeric solution, the viscosity of said polymeric solution increasing rapidly upon the addition of the water from less than 20,000 cps to greater than 50,000 cps.

This process of substantially increasing the viscosity of an organic solvent containing the aforementioned polymer can be employed in many diverse applications. For example, the polymer solution can be employed to plug a pipe, channel, or orifice simply by admixture with water with shear to provide a viscous mixture. An article could also be suspended in the polymeric solution having the viscosity of less than 20,000 cps and thereby be encapsulated in the polymeric solution having a viscosity greater than 500,000 cps, when the water is added to the polymeric solution having a viscosity of less than 20,000 cps.

When the solution having a viscosity greater than 50,000 cps is formed by the addition of water to the polymeric solution having a viscosity less than 20,000 cps, the water interacts with the ionic polymer thereby causing gellation. The water can be removed from the solution phase by conventional liquid extraction methods. The formation of the polymeric solution having a viscosity of 500,000 cps from the polymeric solution having a viscosity less than 20,000 cps can be quite rapid in the order of less than 1 minute to about 24 hours, more preferably less than 1 minute to about 30 minutes, and most preferably less than 1 minute to about 10 minutes, however, this depends on temperature, shear, solvent type, etc.

The component materials of the instant process generally include an amine terminated polyalkylene oxide ionomeric polymer such as an amine terminated polyalkylene oxide neutralized sulfonated polymer, an organic liquid, and water.

The graft copolymers of this invention can be derived from any backbone containing sulfonic acid groups whether they be elastomeric or thermoplastic in nature. Specific examples include polystyrene, EPDM, butyl rubber, styrene-ethylene oxide copolymers, polypentenamer, SBR, poly-t-butylstyrene, polyisoprene, and the like.

The polymers of this invention are composed of sulfonic acid-containing polymers which have been neutralized with polyalkylene oxides possessing amine end groups. These latter materials can also be described as N-polyalkylene oxide substituted amines. The polyalkylene oxide chains are composed of homo- and copolymers of terminal epoxide monomers

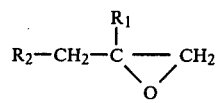

where $R_1$ is hydrogen or an alkyl group and $R_2$ is hydrogen, an alkyl group, a cycloalkyl group, an aryl group, halogen, an alkoxy group, or an aryloxy group.

Examples are ethylene oxide, propylene oxide, butylene oxide, isobutylene oxide, vinyl cyclohexane epoxide, epichlorohydrin, styrene oxide, methyl glycidyl ether, and phenyl glycidyl ether.

The N-polyalkylene oxide substituted amines can be derived from mono-amines or poly-amines. The monoamines can be primary, $R_1$—$NH_2$, or secondary, $R_2R_3$—$NH$, amines wherein the $R_1$, $R_2$, and $R_3$ groups can be alkyl, cycloalkyl, aryl, alkaryl, and aralkyl. Examples of these substituents are methyl, ethyl, propyl, butyl, decyl, lauryl, octadecyl, cyclohexyl, phenyl, tolyl, benzyl, and the like. The polyamines have the general formula:

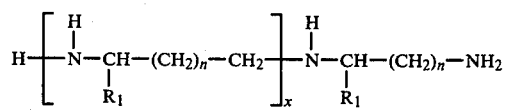

where $n=0$ to about 4, $x=0$ to about 5, and $R_1$ is hydrogen, an alkyl or aryl group. Examples of such polyamines are ethylene diamine, 1,2-propylene diamine, 1,3-propylene diamine, 1,6-hexanediamine, diethylene triamine, triethylene, tetramine, and the like. The lower alkylene groups are preferred and the ethylene group is most preferred. Of the ethylene derivatives ethylene diamine itself is most preferred.

The amine terminated polyalkylene oxide chains can be homo- or copolymers of alkylene oxides. The molecular weights of the amine terminated N-polyalkylene oxides can be from about 600 to about 50,000, preferably about 1,000 to about 30,000, most preferably about 1,200 to about 20,000.

The polyalkylene oxide chains should possess a degree of sensitivity to water if not fully water soluble. Those homopolymer polyalkylene oxides which are sparingly soluble in water are best copolymerized with epoxides whose homopolymers possess a high degree of water solubility, such as ethylene oxide. In fact, polyalkylene oxides composed solely or largely of ethylene oxide units are especially preferred in the practice of this invention.

Useful N-polyalkylene oxide substituted amines are the ethoxylated long chain, fatty acid derived amines such as ethoxylated stearyl amine

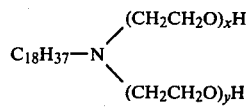

where x and y can be from 5 to 200. Especially useful are ethoxylated stearyl and lauryl amines where $x+y=50$.

Useful N-polyalkylene oxide substituted polyamines are the Tetronic polyols manufactured by BASF Wyandotte and derived from ethylene diamine, ethylene oxide, and propylene oxide, with the approximate formula shown below:

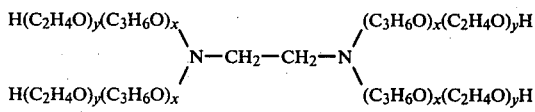

These materials are composed of blocks of propylene oxide and ethylene oxide. They vary in ethylene oxide content (10-80 weight %) and in overall molecular weight (1650-27,000).

The products resulting from the neutralization of sulfonic acid-containing thermoplastics with amine terminated polyalkylene oxides are determined not only by the composition of the thermoplastic backbone, but also by (1) the sulfonate content of the polymer, (2) the molecular weight of the amine terminated polyalkylene oxide, and (3) the composition of the final neutralized product, i.e., the relative amounts of thermoplastic polymer and amine terminated polyalkylene oxide. It is clear that the final composition is a function of both sulfonic acid content and molecular weight of the amine terminated polyalkylene oxide.

The sulfonic acid-containing thermoplastics useful for this invention contain from about 5 meq. to about 150 meq. sulfonic acid per 100 g of polymer, preferably from about 10 meq. to about 125 meq., and most preferably from about 15 meq. to about 100 meq.

The neutralization of the cited polymers with the amine terminated polyalkylene oxide can be conducted by means well-known in the art. For example, the sulfonation process as with butyl rubber containing a small 0.3 to 1.0 mole % unsaturation can be conducted in a suitable solvent such as toluene with acetyl sulfate as the sulfonating agent such as described in U.S. Pat. No. 3,836,511. The amounts of such amine terminated polyalkylene oxide neutralization agents employed will normaly be equal stoichiometrically to the amount of free acid in the polymer plus an unreacted reagent which still is present. It is preferred that the amount of amine terminated polyalkylene oxide neutralizing agent be equal to the molar amount of sulfonating agent originally employed plus 10% more to insure full neutralization. The use of more of such amine terminated polyalkylene oxide neutralization agent is not critical. Sufficient amine terminated polyalkylene oxide neutralization agent is necessary to effect at least 50% neutralization of the sulfonic acid groups present in the polymer, preferably at least 90%, and most preferably essentially complete neutralization of such acid groups should be effected.

The degree of neutralization of said ionomeric groups may vary from 50 to 500 mole % preferably 90 to 200%. Most preferably it is preferred that the degree of neutralization be substantially complete, that is with no substantial free acid present and without substantial excess of the base other than that needed to insure neutralization. Thus, it is clear that the polymers which are utilized in the instant invention comprise substantially amine terminated polyalkylene oxide neutralized pendant groups and, in fact, an excess of the amine terminated polyalkylene oxide neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones be not crosslinked and (in the absence of the ionic groups) be soluble in the organic liquid whose viscosity is to be controlled. To achieve the desired solubility, it is required that the polymer to be employed possess a degree of polarity consistent with that solvent. This solubility relationship can readily be established by anyone skilled in the art simply by appropriate tests (e.g., Polymer Handbook, Edited by Brandrup and Emmergut, Interscience Publishers, 1967, section IV-341). In the absence of appropriate polymersolvent compatibility knowledge, this can be determined experimentally by observing whether the selected polymer will be soluble in the solvent at a level of 1 gm. polymer per 100 ml solvent. If the polymer is soluble, then this demonstrates that it is an appropriate backbone for modification with ionic groups to achieve the objectives of this invention. It is also apparent that polymers which are too polar will not be soluble in the relatively nonpolar organic liquid of this invention. Therefore, only those polymer backbones (i.e., as measured in the absence of ionic groups) having a solubility parameter less than 10.5 are suitable in this invention. This precludes the use of such polymers as polyvinyl alcohol, polyacrylonitrile, etc. Also, highly crystalline polymers are to be avoided since they tend not to be soluble in the relatively nonpolar organic liquids employed herein. Therefore, acceptable polymers employed in this invention must possess a level of crystallinity of less than 25%. Thus, these acceptable polymers can be considered substantially noncrystalline.

The preferred ionic copolymers for use in the instant invention, e.g., sulfonated polystyrene and substituted derivatives thereof, may be prepared by the procedures described in U.S. Pat. No. 3,870,841, filed on Oct. 2, 1972, in the names of H. S. Makowski, R. D. Lundberg, and G. H. Singhal, hereby incorporated by reference.

The ionomeric polymers may be incorporated into the organic liquid at a level of from 0.1 to 20 weight % preferably from 0.2 to 10 weight %, most preferably from 0.5 to 5 weight % based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated propylene copolymers, sulfonated styrene-methyl methacrylate copolymers, (styrene)acrylic acid copolymers, sulfonated polyisobutylene, sulfonated ethylene-propylene terpolymers, sulfonated butyl rubber, sulfonated polyisoprene, sulfonated polyvinyl toluene, and sulfonated polyvinyl toluene copolymers.

The ionomeric polymers of the instant invention may be prepared prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The amine terminated by polyalkylene oxide neutralized polymer may then be isolated by means well known to those skilled in the art; i.e., coagulation, steam stripping, or solvent evaporation, because the amine terminated polyalkylene oxide neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization required preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of an amine terminated polyalkylene oxide neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice versa. The organic liquid is selected from the group consisting essentially of aromatic hydrocarbons, ketones, chlorinated aliphatic hydrocarbons, aliphatic hydrocarbons, cyclic aliphatic ethers, aliphatic ethers, paraffinic oils, diesel fuel, and organic aliphati esters and mixtures thereof.

Specific examples of organic liquids to be employed with various types of polymers are:

| Polymer | Organic Liquid |
|---|---|
| Sulfonated polystyrene | Benzene, toluene, ethyl benzene, methylethyl ketone, xylene, styrene, ethylene dichloride, methylene chloride |
| Sulfonated poly-t-butyl-styrene | Benzene, toluene, xylene, ethyl benzene, styrene, t-butyl styrene, aliphatic oils, aromatic oils, hexane, heptane decane, nonane, pentane |
| Sulfonated ethylene-propylene terpolymer | Aliphatic and aromatic solvents, oils such as Solvent "100 Neutral", "150 Neutral" and similar oils, benzene, diesel oil, toluene, xylene, ethyl benzene, pentane, hexane, heptane, octane, iso-octane, nonane, decane, aromatic solvents, ketone solvents |
| Sulfonated styrene-methyl-methacrylate copolymer | Dioxane, halogenated aliphatics, e.g., methylene chloride, tetrahydrofuran |
| Styrene-acrylic acid copolymers | Aromatic solvents, ketone solvents, tetrahydrofuran, dioxane, halogenated aliphatics, e.g., methylene chloride |
| Sulfonated polyisobutylene | Saturated aliphatic hydrocarbons, diisobutylene, triisobutylene, aromatic and alkyl substituted aromatic hydrocarbons, chlorinated hydrocarbons, n-butyl ether, n-amyl ether, methyl oleate, aliphatic oils, oils predominantly paraffinic in nature and mixtures containing naphthenic hydrocarbons "Solvent 100 Neutral", "Solvent |

| Polymer | Organic Liquid |
|---|---|
| | 150 Neutral" and all related oils, low molecular weight polymeric oils such as squalene, white oils and process oils having 60% or less aromatic content |
| Sulfonated polyvinyl toluene | Toluene, benzene, xylene, cyclohexane, ethyl benzene, styrene, methylene, chloride, ethylene dichloride. |

The amount of water added to the solution of the amine terminated polyalkylene oxide neutralized sulfonated polymer, and organic liquid having a viscosity of less than about 20,000 cps, is about 1 to about 500 vol. % of water, more preferably about 1 to about 300 vol. % of water, and most preferably about 1 to about 100 vol. % water.

DETAILED DESCRIPTION OF THE PREFERRED EMBODIMENT

EXAMPLE 1

The preparation of lightly sulfonated polystyrene as the free acid was conducted as follows: 1248 grams of a commercial polystyrene having a number average molecular weight of about 110,000 was dissolved in 6.0 liters of 1,2 dichloroethane at 50° C. A clear homogeneous solution was obtained. The sulfonation was conducted by adding an appropriate amount of acetic anhydride and sulfuric acid to the polymer solution so as to achieve the desired level of sulfonation. Acetic anhydride was added (158.8 grams) and the sulfuric acid (99.1 grams) was dripped in slowly. The reaction mixture was stirred at 50° C. for 1 hour after all the sulfuric acid was added. The sulfonation reaction was then terminated by adding 150 ml of methanol and the polymer recovered by vaporizing off the solvent in a large excess of boiling water. The resultant polymer mass was pulverized by adding an excess of water and subjecting the mixture to high speed shear in a laboratory blender. The resultant crumb was filtered. The water wet crumb was then dried in a laboratory fluid bed dryer at 170° F. to 190° F. Analysis of the final product gave a figure of 2.02 weight percent sulfur indicating 86% conversion of the sulfonation reagents. This sulfur level corresponds to a sulfonic acid content of 63.1 mmoles per 100 gms of polymer or about 6.9 mole percent sulfonic acid content.

The polystyrene sulfonic acid (9.9 gms) was dissolved in 1,000 ml of methylene dichloride along with 90.1 grams of a polyalkylene oxide substituted ethylene diamine having the following formula:

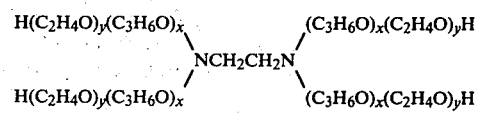

wherein each of the polyalkylene oxide blocks substituted on the diamine has a molecular weight of about 5,000 for a total molecular weight of about 20,000 wherein about 70% of the alkylene oxide is ethylene oxide. In addition about 0.5 gm of a commercial antioxidant (2246) was added to stabilize the products. The sample was evaporated to dryness in a shallow vessel and then vacuum dried for 16 hours at 80° to 100° C.; 30 grams of the polymer was dissolved in 100 ml of xylene to provide a viscosity of 860 cps. Various aliquots of water were added followed by high speed shear and the viscosity of the resulting mixtures measured as shown in The viscosities of the resulting solutions or suspensions were measured and the values shown in Table I. After the addition of 10% water the resultant mixture possessed a viscosity of greater than 1,000,000 cps.

TABLE I

GELATION WITH WATER AMINE TERMINATED POLYALKYLENE OXIDE NEUTRALIZED SULFONATED POLYSTYRENE

| Ex. | Meq. | Polyalkylene Oxide | Conc. % | Solvent | Initial Solution Viscosity | Addition of Water | |
|---|---|---|---|---|---|---|---|
| | | | | | | % H$_2$O | Viscosity, CPS at 25° C. |
| 1 | 63.1 | Tetronic 1107 | 30 | Xylene | 860 cps | 1% | Gel clumps, settles to yellow murky gel |
| | | | | | | 5% | Fully gels out, separates from solvent |
| 2 | 15.9 | Tetronic 707 | 20 | 150 Xylene 47 CHCl$_3$ | 296 cps | 1% | 400 cps |
| | | | | | | 5% | 32,960 cps (lumpy gel) |
| | | | | | | 10% | 293,040 cps (pasty gel) |
| | | | | | | 50% | >3,300,000 cps (dense pasty gel) |
| 3 | 31.6 | Tetronic 504 | 15 | Toluene | 187 cps | 1% | 504 cps |
| | | | | | | 5% | 1,162,000 cps |
| | | | | | | 10% | 1,864,800 cps |
| | | | | | | 50% | White granular oatmeal gel mass |

Table I.

EXAMPLE 2

The sulfonation experiment described in Example 1 was conducted in the same manner except that only 39.7 gms of acetic anhydride and 24.8 gms of sulfuric acid was added as the sulfonating reagents. The resulting product contained 0.51% sulfur corresponding to 1.67 mole % sulfonic acid.

A sample of 34.4 grams of polystyrene sulfonic acid was dissolved in 1,000 ml of methylene chloride. A sample of 70 grams of polyalkylene oxide substituted ethylene diamine similar to that of Example 1 was added to the methylene chloride. In this example the molecular weight of the polyalkylene oxide was about 12,000 with about 70% of the alkylene oxide composition being ethylene oxide. The polymer was located as in Example 1. Part of the resulting polymer (37.5 grms) was dissolved in a mixture of xylene and chloroform (150 ml of xylene and 47 ml chloroform) to yield a solution with a viscosity of 296 cps. Various aliquots of water was added to the solution and the mixture exposed to high shear with the results described in Table I. At a level of 50% water (based on total polymer solution) the product is an extremely dense pasty gel.

EXAMPLE 3

The sulfonation experiment described in Example 1 was conducted in the same manner except that 79.4 gms of acetic anhydride and 49.6 gms of sulfuric acid was added as the sulfonating reagents. The resulting product contained 1.01 weight percent sulfur or 3.37 mole percent sulfonic acid groups.

The polymer sulfuric acid (48.2 gms) was dissolved in 1,000 ml of methylene chloride and neutralized with 107.4 g of a substituted ethylene diamine as described in Example 1 except this diamine had a molecular weight of approximately 3400 and contained about 40% ethylene oxide in the polyalkylene oxide block along with 0.5 gm antioxidant. The product was recovered as in Example 1.

The polymer (15 grams) was dissolved in 100 ml of toluene with a solution viscosity of 187 cps at 25° C. Various amounts of water were added to the solution, and the resulting mixture exposed to high speed shear.

What is claimed is:

1. A process for increasing the low shear solution viscosity which includes the steps of:
    (a) dissolving an amine terminated polyalkylene oxide neutralized sulfonated polymer in a solvent to form a polymeric solution, a concentration of said amine terminated polyalkylene oxide neutralized sulfonated polymer in said polymer solution being about 0.1 to about 20 wt. %. a viscosity of said polymeric solution being about 10 to about 5,000 cps; and
    (b) adding about 1 to about 500 volume % water to said solution, said water being immiscible with said polymeric solution, the viscosity of said solution or suspension increasing upon the addition of said water to at least 50,000 cps.

2. A process according to claim 1, wherein said organic liquid has a boiling point greater than said water.

3. A process according to claim 2, further including the step of heating said solution having a viscosity greater than 50,000 cps to a temperature greater than the boiling point of said water, but less than that of said organic liquid thereby isolating a water insoluble gel of said amine terminated polyalkylene oxide neutralized sulfonated polymer in said organic liquid.

4. A process according to claim 3, further including heating said water insoluble gel to a temperature above the boiling point of said organic liquid thereby removing said organic liquid from said gel to form a solid amine terminated polyalkylene oxide neutralized sulfonated polymer.

5. A process according to claim 3, further including the step of depositing said gel on a substrate prior to heating said water insoluble gel to said temperature above said boiling point of said organic liquid thereby forming a coating of said amine terminated polyalkylene oxide neutralized sulfonated polymer on said substrate.

6. A process according to claim 1 further including the step of heating said solution and said water to a temperature above the boiling points of said water, and said organic liquid forming free amine terminated polyalkylene oxide neutralized sulfonated polymer.

7. A process according to claim 1, further including the step of separating said water from said polymer solution having a viscosity greater than 50,000 cps thereby forming a water insoluble gel of said amine terminated polyalkylene oxide neutralized sulfonated polymer in said organic liquid.

8. The product prepared by the process of claim 1.

9. The product prepared by the process of claim 7.

10. A process according to claim 7, further including suspending an article in said solution having a viscosity less than about 20,000 cps, thereby permitting said water insoluble gel to be encapsulated within said substance having a viscosity greater than 50,000 cps upon the addition of said water to said solution having a viscosity less than about 20,000 cps.

11. The product prepared by the process of claim 10.

12. A process according to claim 1, further including an article having an opening therein and forming said solution having a viscosity greater than 50,000 cps within said opening.

13. A process according to claim 1, further including an elongated member having a bore therein and forming said solution having a viscosity greater than 500,000 cps within said bore.

14. A process according to claim 1, wherein said neutralized sulfonated polymer has about 10 to about 200 meq. of pendant sulfonate groups per 100 grams of polymer.

15. A process according to claim 14, wherein said sulfonate groups are neutralized within an amine terminated polyalkylene oxide.

16. A process according to claim 1, wherein said amine terminated polyalkylene oxide has the formula:

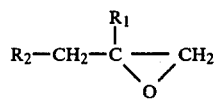

wherein $R_1$ is hydrogen or alkyl group and $R_2$ is hydrogen, an alkyl group, a cycloalkyl group, an aryl group, halogen, and alkoxy group or an aryloxy group.

17. A process according to claim 15, wherein said sulfonate groups are at least 90 mole % neutralized.

18. A process according to claim 1, wherein said neutralized sulfonated polymer is formed from an elastomeric polymer.

19. A process according to claim 18, wherein said elastomeric polymer is selected from the group consisting of EPDM terpolymer and Butyl rubber.

20. A process according to claim 1, wherein said neutralized sulfonated polymer is formed from a thermoplastic.

21. A process according to claim 20, wherein said thermoplastic is selected from the group consisting of polystyrene, t-butyl styrene, ethylene copolymers, propylene copolymers, and styrene/acrylonitrile copolymer.

22. A process according to claim 1, wherein said neutralized sulfonated polymer further includes a filler admixed therewith.

23. A process according to claim 1, wherein said neutralized sulfonated polymer further includes a polymeric substance admixed therewith.

24. A process according to claim 1, wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

25. A process according to claim 1, wherein said organic liquid is selected from the group consisting of aliphatic hydrocarbons and aromatic hydrocarbons.

26. A process according to claim 1, wherein said organic liquid is selected from the group consisting of benzene, toluene, ethyl benzene, xylene and styrene and mixtures thereof.

27. A process according to claim 1, wherein said neutralized sulfonated polymer is formed from polystyrene.

28. The product prepared by the process of claim 27.

29. The process of claim 1 where the viscosity of the solution is less than 20,000 cps and increases with water addition to greater than 500,000 cps.

30. A process according to claim 1, wherein said organic liquid is selected from the group consisting of oils which are predominantly paraffinic in composition.

31. A process according to claim 1, wherein said organic liquid is selected from the group consisting of aromatic, hydrocarbons, diesel fuel and paraffinic oils.

* * * * *